(12) United States Patent
Partridge et al.

(10) Patent No.: US 8,211,300 B2
(45) Date of Patent: Jul. 3, 2012

(54) VEHICLE-MOUNTED FUEL SEPARATION SYSTEM

(75) Inventors: Randall D. Partridge, Califon, NJ (US); Kouseki Sugiyama, Numazu (JP)

(73) Assignees: ExxonMobil Research and Engineering Company, Annandale, NJ (US); Toyota Jidosha Kabushiki Kaisha, Toyota (JP)

( * ) Notice: Subject to any disclaimer, the term of this patent is extended or adjusted under 35 U.S.C. 154(b) by 724 days.

(21) Appl. No.: 12/318,128

(22) Filed: Dec. 22, 2008

(65) Prior Publication Data

US 2010/0155315 A1    Jun. 24, 2010

(51) Int. Cl.
*B01D 35/18*    (2006.01)

(52) U.S. Cl. .................. 210/181; 210/149; 210/321.6; 123/1 A

(58) Field of Classification Search .......... 210/149, 210/175–187, 321.6–321.9; 123/1 A; 261/18.3
See application file for complete search history.

(56) References Cited

U.S. PATENT DOCUMENTS

| | | | | |
|---|---|---|---|---|
| 4,031,864 A * | 6/1977 | Crothers | ................ | 123/1 A |
| 6,332,448 B1 | 12/2001 | Ilyama et al. | | |
| 6,972,093 B2 * | 12/2005 | Partridge et al. | ........... | 210/321.6 |
| 7,395,786 B2 * | 7/2008 | Leone et al. | ................ | 123/1 A |
| 7,665,428 B2 * | 2/2010 | Dearth et al. | ................ | 123/1 A |
| 7,803,275 B2 * | 9/2010 | Partridge et al. | ........... | 210/640 |
| 7,981,278 B2 * | 7/2011 | Kamio et al. | ................ | 210/86 |
| 2002/0139111 A1 * | 10/2002 | Ueda et al. | ................ | 60/285 |
| 2002/0139321 A1 * | 10/2002 | Weissman et al. | ........... | 123/1 A |
| 2004/0144723 A1 * | 7/2004 | Gloeckle et al. | ........... | 210/640 |
| 2004/0149644 A1 | 8/2004 | Partridge et al. | | |
| 2005/0103715 A1 * | 5/2005 | Sabottke et al. | ........... | 210/650 |
| 2007/0219674 A1 * | 9/2007 | Leone | ................ | 701/1 |

FOREIGN PATENT DOCUMENTS

| | | |
|---|---|---|
| JP | A-2001-050070 | 2/2001 |
| JP | A-2004-232624 | 8/2004 |

* cited by examiner

*Primary Examiner* — Duane Smith
*Assistant Examiner* — Thomas McKenzie
(74) *Attorney, Agent, or Firm* — Oliff & Berridge, PLC

(57) ABSTRACT

A vehicle-mounted fuel separation system 24 is provided with a fuel heating device 56 heating stock fuel and a separator 57 separating stock fuel heated by the fuel heating device into a plurality of types of fuel. Furthermore, a forced exhaust device 66 forcibly exhausting the fuel in the fuel heating device from the fuel heating device when the temperature of the fuel in the fuel heating device becomes a reference temperature or more or is expected to become a reference temperature or more is provided. Due to this, a fuel separation system where excessive heating of the fuel by the fuel heating device of the fuel separation system is prevented is provided.

8 Claims, 5 Drawing Sheets

VEHICLE-MOUNTED FUEL SEPARATION SYSTEM

TECHNICAL FIELD

The present invention relates to a vehicle-mounted fuel separation system.

BACKGROUND ART

Known in the art is a fuel separation system separating fuel supplied as a stock material (that is, "stock fuel") to produce fuels differing in properties from the stock fuel. As such a fuel separation system, for example, there is the one provided with a separation membrane selectively passing the high octane value component in the fuel (for example, Japanese Patent Publication (A) No. 2004-232624). In this fuel separation system, high octane value fuel with an octane value higher than the stock fuel is produced at one side of the separation membrane, while low octane value fuel with an octane value lower than the stock fuel is produced at the other side of the separation membrane.

In particular, in the fuel separation system described in Japanese Patent Publication (A) No. 2004-232624, the stock fuel supplied to the separation membrane is raised in temperature by a heat exchanger to increase the ratio of the amount of high octane value component passing through the separation membrane relative to the amount of high octane value component contained in the fuel. Due to this, it is possible to raise the separation efficiency of the stock fuel in the fuel separation system.

However, as explained above, in a fuel separation system, to raise the separation efficiency of the stock fuel, it is necessary to raise the temperature of the stock fuel supplied to the separation membrane. For this reason, in most cases, the fuel separation system is provided with a fuel heating device for heating the stock fuel, in particular, a heat exchanger.

However, if using a heat exchanger for heating the stock fuel, depending on the type of the heat exchanger, sometimes it is not possible to accurately control the amount of heat supplied to the stock fuel and sometimes the fuel ends up being excessively heated by the heat exchanger.

Further, if the internal combustion engine is stopped, usually the feed of fuel to the internal combustion engine is made to stop. If the feed of fuel to the internal combustion engine is stopped, the fuel in the fuel feed passage remains as is at that position. Therefore, at the time when the internal combustion engine is stopped, the fuel which was in the heat exchanger remains as is inside the heat exchanger.

However, in general, a heat exchanger supplies heat to stock fuel in the heat exchanger over a certain period even after the internal combustion engine stops. For this reason, the fuel remaining in the heat exchanger after the internal combustion engine stops will sometimes end up being excessively heated. If fuel ends up being excessively heated in this way, spoilage of the fuel, incomplete circulation of the fuel due to bubbles in the fuel feed passage, etc. may be incurred.

DISCLOSURE OF INVENTION

Therefore, an object of the present invention is to provide a fuel separation system by which fuel ending up being excessively heated by the fuel heating device of the fuel separation system is prevented.

To achieve the above object, in one aspect of the present invention, there is provided a vehicle-mounted fuel separation system provided with a fuel heating device heating stock fuel and a separator separating stock fuel heated by the fuel heating device into a plurality of types of fuel, further provided with a forced exhaust device forcibly exhausting the fuel in the fuel heating device from the fuel heating device when the temperature of the fuel in the fuel heating device becomes a reference temperature or more or is expected to become the reference temperature or more. According to the above aspect, when the temperature of the fuel in the fuel heating device becomes a reference temperature or more or when it is expected to become a reference temperature or more, the fuel in the fuel heating device is forcibly exhausted.

In another aspect of the present invention, the forced exhaust device is provided with an ejector provided on a fuel passage bypassing the fuel heating device and the forced exhaust device uses the negative pressure generated by the fuel being passed through the ejector so as to forcibly exhaust the fuel in the fuel heating device from the fuel heating device.

In still another aspect of the present invention, the system is further provided with a fuel return device for returning the fuel in the fuel heating device to the stock fuel tank, and when the temperature of the fuel in the fuel heating device becomes a reference temperature or more or when it is expected to become the reference temperature or more, the return of the fuel in the fuel heating device by the fuel return device is started before the exhaust of fuel in the fuel heating device by the forced exhaust device is started.

In still another aspect of the present invention, the fuel return device is provided with a branch passage branching off from a fuel feed passage, communicating the fuel heating device and stock fuel tank and feeding fuel from the stock fuel tank to the fuel heating device, toward the stock fuel tank and a shutoff valve provided at the branch passage, and the shutoff valve is opened when returning the fuel in the fuel heating device to the stock fuel tank.

In still another aspect of the present invention, at the time when the operation of the internal combustion engine is stopped, it is judged that it is a time when the temperature of the fuel in the fuel heating device is expected to become the reference temperature or more.

In still another aspect of the present invention, the fuel heating device is a heat exchanger utilizing the heat generated by combustion of the air-fuel mixture in the internal combustion engine.

In still another aspect of the present invention, the fuel heating device utilizes the heat produced by electric power to heat the stock fuel.

In still another aspect of the present invention, the plurality of types of fuel include high octane value fuel with an octane value higher than the stock fuel and low octane value fuel with an octane value lower than the stock fuel.

According to the present invention, when the fuel in the fuel heating device is liable to be excessively heated, the fuel is forcibly exhausted from the fuel heating device and therefore fuel can be prevented from being excessively heated by the fuel heating device of the fuel separation system.

BRIEF DESCRIPTION OF THE DRAWINGS

The present invention will be more clearly understood from the description as set forth below with reference to the accompanying drawings, in which.

BEST MODE FOR CARRYING OUT THE INVENTION

Figure 1:
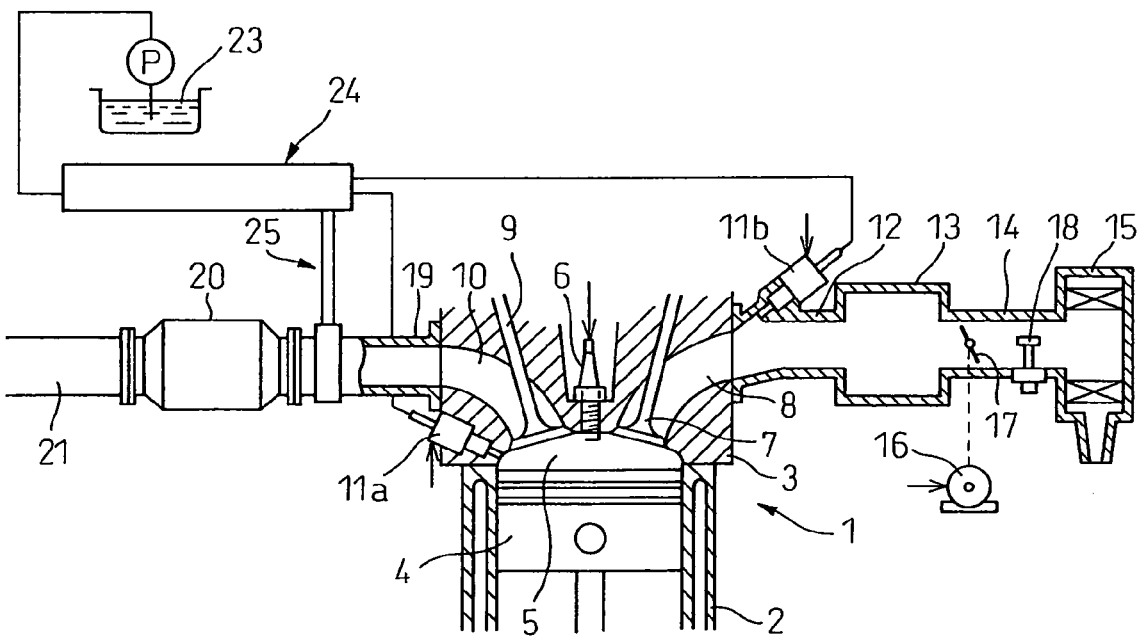
FIG. 1 is a view showing a side cross-sectional view of a spark ignition type internal combustion engine.

Below, a vehicle-mounted fuel separation system of an embodiment of the present invention will be explained in detail with reference to the drawings. FIG. 1 shows a side cross-sectional view of a spark ignition type internal combustion engine at which a fuel separation system is mounted.

Referring to FIG. 1, 1 indicates an engine body, 2 a cylinder block, 3 a cylinder head, 4 a piston, 5 a combustion chamber, 6 a spark plug arranged at the center of the top of the combustion chamber 5, 7 a intake valve, 8 a intake port, 9 an exhaust valve, and 10 an exhaust port. On peripheral region of each cylinder inner wall of the cylinder head 4, a fuel injector 11a for injecting fuel directly into the combustion chamber 5 (below referred to as "in-cylinder fuel injector") is arranged. Each intake port 8 is connected through a intake branch pipe 12 to a surge tank 13. At each intake branch pipe 12, a fuel injector 11b for injecting fuel toward the inside of the corresponding intake port 8 (below referred to as a "port injection fuel injector") is arranged.

The surge tank 13 is connected through a intake duct 14 to an air cleaner 15. Inside the intake duct 14, a throttle valve 17 driven by an actuator 16 and an airflow meter 18 are arranged. On the other hand, each exhaust port 10 is connected through an exhaust manifold 19 to a catalytic converter 20 housing an exhaust purification catalyst (for example three-way catalyst). The catalytic converter 20 is connected to an exhaust pipe 21.

The fuel injectors 11a, 11b are connected to the fuel tank 23. A fuel separation system 24 is provided between the fuel injectors 11a, 11b and the fuel tank 23. The fuel separation system 24 separates the stock fuel (gasoline stored in the fuel tank 3) into high octane value fuel with an octane value higher than the stock fuel and low octane value fuel with an octane value lower than the stock fuel. Further, the exhaust pipe 21 is provided with an exhaust heat recovery system 25 recovering heat from the exhaust gas flowing through the exhaust pipe 21 and transferring the heat to the object to be heated.

Figure 2:
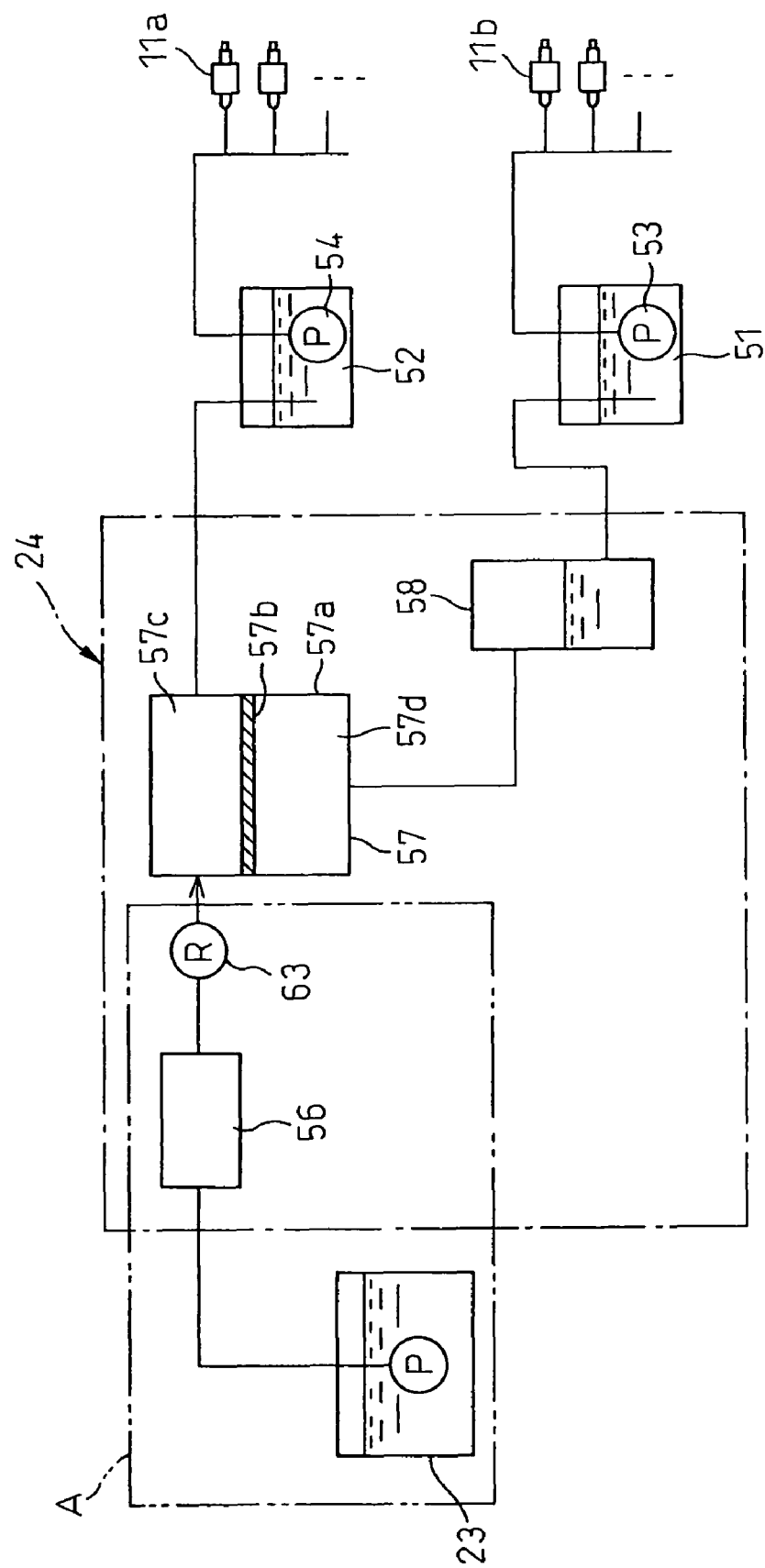
FIG. 2 is a view schematically showing the schematic configuration of a fuel feed mechanism.

Next, the configuration of the vehicle-mounted fuel separation system 24 of the present embodiment will be explained with reference to FIG. 2. FIG. 2 is a view schematically showing the schematic configuration of a fuel feed mechanism.

The fuel feed mechanism shown in FIG. 2 is provided with a stock fuel tank 23, fuel separation system 24, high octane value fuel tank 51, and low octane value fuel tank 52. The stock fuel tank 23 is supplied with and stores ordinary (commercially available) gasoline. The fuel stored in the stock fuel tank 23 is separated by the fuel separation system 24 into high octane value fuel with an octane value higher than the stock fuel and low octane value fuel with an octane value lower than the stock fuel. The separated fuels are respectively stored in the high octane value fuel tank 51 and the low octane value fuel tank 52.

The high octane value fuel in the high octane value fuel tank 51 is fed by the feed pump 53 to each port injection fuel injector 11b and injected to the intake port 8 of each cylinder. On the other hand, the low octane value fuel in the low octane value fuel tank 52 is fed by the feed pump 54 to each in-cylinder fuel injector 11a and directly injected into the combustion chamber 5 of each cylinder.

In this way, in the present embodiment, mutually independent fuel injectors 11a, 11b are used for the low octane value fuel and the high octane value fuel, so it is possible to selectively supply one of the low octane value fuel and high octane value fuel or simultaneously supply both of them by a predetermined ratio in accordance with the engine operating state to the combustion chambers 5 of the cylinders of the engine body 1.

Next, a fuel separation system 24 of the present embodiment will be simply explained while referring to FIG. 2. The fuel separation system 24 is provided with a heat exchanger 56, a separation unit 57 having a separation membrane, a condenser/gas-liquid separator 58, etc.

The separation unit 57 is configured separating a housing 57a comprised of a heat resistant vessel into two sections 57c, 57d by an aromatic separation membrane 57b. As the aromatic separation membrane 57b, one having the property of selectively passing the aromatic components in gasoline is used. That is, in the aromatic separation membrane 57b, if supplying stock fuel to one side (for example, the section 57c side, that is, the low octane value fuel side) at a relatively high pressure and holding the other side (for example, the section 57d side, that is, the high octane value fuel side) at a relatively low pressure, the aromatic components in the stock fuel mainly permeate through the separation membrane 57b to the surface of the low pressure side (the section 57d side, that is, the high octane value fuel side) of the separation membrane 57b and cover the surface of the separation membrane 57b facing the low pressure side.

By removing the liquid fuel covering the surface of this low pressure side separation membrane 57b, the aromatic components permeate from the high pressure section 57c side to the low pressure section 57d side continuously through the separation membrane 57b. In the present embodiment, by maintaining the pressure at the low pressure side (section 57d side) at a pressure lower than the vapor pressure of the permeating aromatic components, the permeate fuel containing a large amount of aromatic components covering the low pressure side separation membrane 57b surface is evaporated to continuously remove it from the surface and is recovered in the form of fuel vapor.

The fuel vapor recovered from the low pressure side section 57d of the separation membrane unit 57 is sent to the condenser/gas-liquid separator 58 where it is cooled. Due to this, the relatively high boiling point aromatic components are liquefied whereby liquid high octane fuel containing a large amount of aromatic components is produced at the bottom of the gas-liquid separator 58. The thus produced high octane value fuel is supplied to the high octane value fuel tank 51.

On the other hand, the fuel remaining in the high pressure side section 57c of the separation membrane unit 57 is stripped of part of its aromatic components to become lower in high octane value component content. Therefore, low octane value fuel with a lower content of aromatic components is produced inside the high temperature side section 57c of the separation membrane unit 57. The thus produced low octane value fuel is supplied to the low octane value fuel tank 52.

Here, the separation efficiency of the separation membrane 57b greatly changes in accordance with the working conditions of this separation membrane 57b. Therefore, to make the separation efficiency of the separation membrane 57b high, it is necessary to suitably control the working conditions of the separation membrane 57b. As a working condition affecting the separation efficiency of such a separation membrane 57b, the temperature of the stock fuel supplied to the separation membrane 57b can be mentioned.

The ratio of the amount of the aromatic components in the stock fuel passing through the separation membrane 57b (selectivity) increases in accordance with the rise in temperature of the stock fuel from atmospheric temperature until reaching a certain temperature. This certain temperature is the temperature where the temperature of the low pressure side (section 57d) of the separation membrane 57b reaches a certain lower limit temperature. This lower limit temperature is a function of the low pressure side pressure of the separation membrane 57b and for example becomes 353K (80° C.) or so at a low pressure side pressure of 5 kPa.

On the other hand, if the temperature at the low pressure side continues to rise exceeding the lower limit temperature, the selectivity falls at a certain temperature or more. That is, there is an optimum temperature range for maintaining the temperature at the low pressure side. This optimum temperature range is for example 348K to 438K (about 75° C. to 165° C.) or so at a low pressure side pressure in the range of 5 to 50 kPa.

Therefore, to maximize the separation efficiency by the separation membrane 57b, it is necessary to maintain the temperature of the stock fuel so that the low pressure side temperature of the separation membrane 57b becomes the optimum temperature range. For this reason, in the present embodiment, before supplying the stock fuel to the separation membrane unit 57, the heat exchanger 56 is used to heat the stock fuel to maintain the temperature whereby the separation efficiency by the separation membrane 57b increases the most.

Note that in this embodiment of the present invention, as the heat exchanger 56, an exhaust heat recovery system 25 recovering heat from the exhaust gas and transferring this recovered heat to the object to be heated (in the present embodiment, stock fuel) is utilized. However, the heat exchanger 56 may also be configured otherwise such as a heat exchanger exchanging heat between the engine body or cooling water and the stock fuel. Alternatively, so long as a fuel heating device heating the stock fuel, it need not be a heat exchanger. For example, it is possible to use an electric heater (that is, a device heating stock fuel utilizing the heat produced by electric power) etc.

Further, the configuration of the above-mentioned fuel feed mechanism and the configuration of the fuel separation system 24 are examples. As long as the fuel separation system using the heat exchanger is provided, any configuration of fuel feed mechanism may be used. Therefore, for example, to separate the stock fuel into high octane value fuel and low octane value fuel, it is also possible to use a separator different from the separation unit 57.

Figure 3:
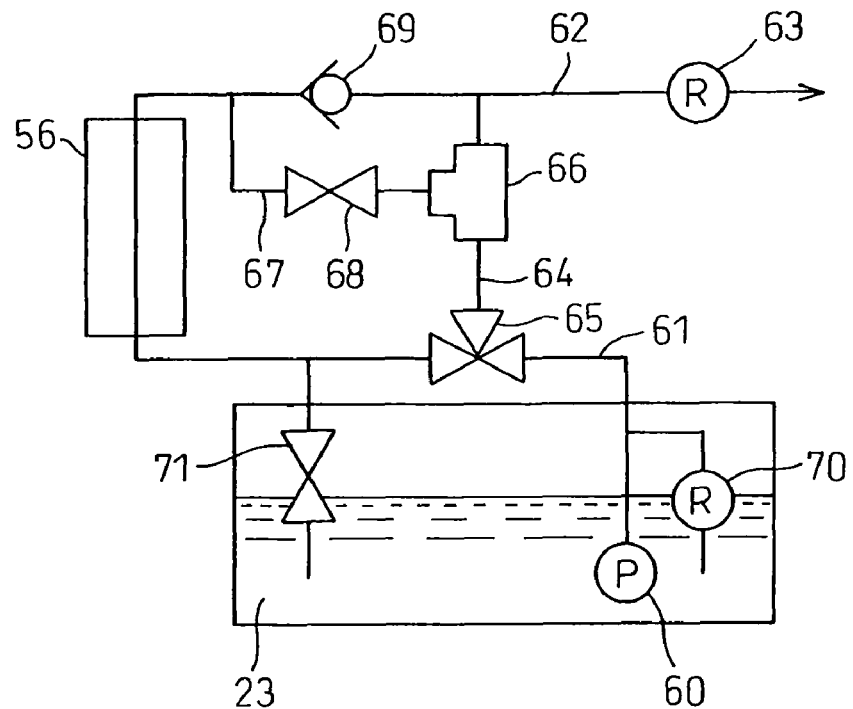
FIG. 3 is a conceptual view showing in detail the part surrounded by A in FIG. 2.

Next, referring to FIG. 3, the configuration of the fuel feed mechanism and fuel separation system 24 will be explained in detail. FIG. 3 is a conceptual view showing the part surrounded by A in FIG. 2 in detail.

As shown in FIG. 3, the fuel pump 60 in the stock fuel tank 23 is connected through the upstream side fuel circulation pipe (the upstream side fuel circulation passage) 61 to the heat exchanger 56. The heat exchanger 56 is connected through the downstream side fuel circulation pipe (the downstream side fuel circulation passage) 62 to the regulator 63. The regulator 63, as shown in FIG. 2, is connected to the high pressure section 57c of the separation unit 57. From the upstream side fuel circulation pipe 62, a bypass pipe (bypass passage) 64 for bypassing the heat exchanger 56 is branched. This bypass pipe 64 is communicated with the downstream side fuel circulation pipe 62. The branch part where the bypass pipe 64 is branched from the upstream side fuel circulation pipe 61 is provided with a three-way valve 65. The three-way valve 65 can switch between a circulation pipe inflow position circulating fuel supplied from the stock fuel tank 23 to the upstream side fuel circulation pipe 61 and a bypass pipe inflow position circulating fuel supplied from the stock fuel tank 23 to the bypass pipe 64. The bypass pipe 64 is provided with an ejector 66.

From the downstream side fuel circulation pipe 62 at the upstream side from the part communicating with the bypass pipe 64, an ejector communicating pipe (ejector communication passage) 67 is branched. The ejector communicating pipe 67 is communicated with the ejector 66 provided in the bypass pipe 65. The ejector 66 generates a negative pressure when fuel flows through the bypass pipe 65. This negative pressure is used to suck in the fuel in the ejector communicating pipe 67. Further, the ejector communicating pipe 67 is provided with a first shutoff valve 68. This first shutoff valve 68 can cut off the flow of the fuel passing through the ejector communicating pipe 67. When the first shutoff valve 68 is open, the fuel can be circulated through the ejector communicating pipe 67. When the first shutoff valve 68 is closed, the fuel will not flow through the ejector communicating pipe 67.

On the other hand, the downstream side fuel circulation pipe 62 is provided with a check valve 69 between the branch part of the ejector communicating pipe 67 and connection part of the bypass pipe 64. This check valve 69 allows the flow of fuel from the heat exchanger 56 toward the regulator 63, but prohibits the flow of fuel from the regulator 63 to the heat exchanger 56.

Further, at the upstream side from the three-way valve 65, a first branch pipe (first branch passage) is branched from the upstream side fuel circulation pipe 61. This first branch pipe is provided with a regulator 70. Therefore, the pressure of the fuel flowing through the inside of the upstream side fuel circulation pipe 61 is maintained at a substantially fixed pressure. Furthermore, at the downstream side from the three-way valve 64, a second branch pipe (second branch passage) is branched from the upstream side fuel circulation pipe 61. This second branch pipe is provided with a shutoff valve 71.

Note that in the configuration of the above-mentioned fuel separation system 24, as the component for sucking in the fuel in the ejector communicating pipe 67 and the heat exchanger 56, that is, as the forced exhaust device for forcibly exhausting the fuel from the heat exchanger 56, the ejector 66 is used. However, if the fuel in the heat exchanger 56 can be forcibly exhausted from the heat exchanger 56, it is possible to use a forced exhaust device other than the ejector 66. It is also possible to for example use a pump etc. or simply the vaporizator of the fuel to exhaust liquid fuel from the heat exchanger.

Figure 4:
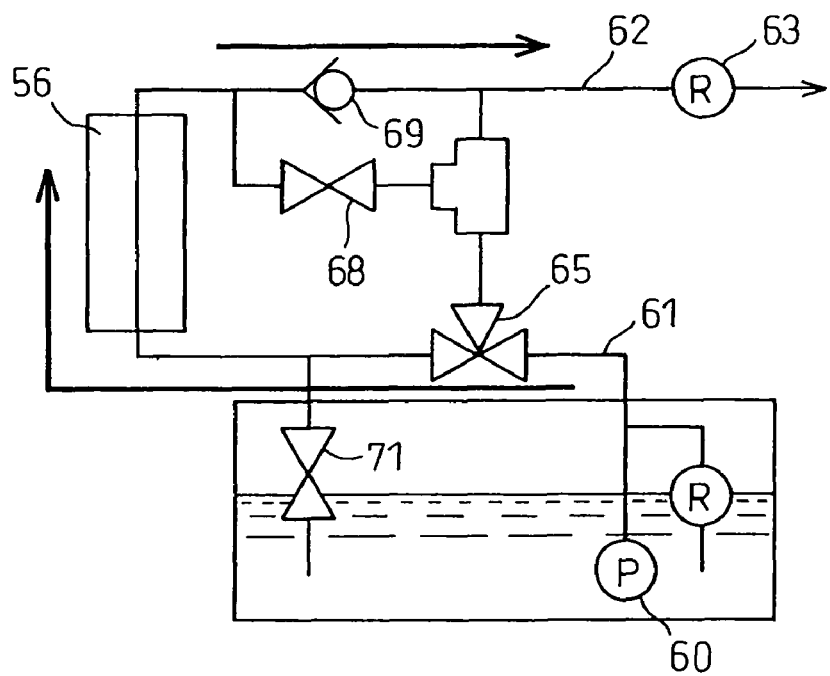
FIG. 4 is a view showing the flow of the stock fuel at the normal time.

Next, the flow of the fuel in the thus configured fuel separation system 24 will be explained. FIG. 4 is a view showing the flow of fuel at the time of normal operation. At the time of normal operation, the three-way valve 65 is set to the circulation pipe inflow position and the first shutoff valve 68 and second shutoff valve 71 are both closed.

For this reason, as shown by the arrow in FIG. 4, the stock fuel raised in pressure by the fuel pump 60 passes through the three-way valve 65 to flow into the heat exchanger 56. After this, the stock fuel flows from the heat exchanger 56 through the check valve 69 and regulator 63 to the separation unit 57. The stock fuel is heated to a suitable temperature at the time of passing through the heat exchanger 56. For this reason, the temperature of the stock fuel flowing into the separation unit 57 becomes the temperature inside the optimum temperature range.

However, depending on the operating conditions of the internal combustion engine, the amount of fuel injected from the fuel injectors 11a, 11b will be small. Therefore, in such a case, the flow rate of the fuel passing through the upstream side fuel circulation pipe 61, heat exchanger 56, and downstream side fuel circulation pipe 62 will also be small. In such a case, if the amount of heat supplied to the fuel in the heat exchanger 56 remains large, the stock fuel in the heat exchanger 56 will end up being excessively heated. In particular, when utilizing the heat of the exhaust gas exhausted from the internal combustion engine to raise the temperature of the stock fuel, the amount of heat transferred to the stock fuel in the heat exchanger 56 is determined in accordance with the temperature of the exhaust gas and flow rate. If the temperature of the exhaust gas exhausted from the internal combustion engine is high and the flow rate is large, the amount of heat transferred to the stock fuel is large, while conversely if the temperature of the exhaust gas is low and the flow rate is small, the amount of heat transferred to the stock fuel is small. Therefore, it is difficult to optimally control the amount of heat transferred to the stock fuel and the situation where the stock fuel becomes excessively heated ends up occurring.

If the stock fuel ends up being excessively heated in the heat exchanger 56, problems such as spoilage of the stock fuel and incomplete circulation of the stock fuel due to bubbles will occur. If such problems occur, a deterioration in the state of combustion in the internal combustion engine will end up being invited.

Therefore, in this embodiment of the present invention, if the stock fuel is excessively heated in the heat exchanger 56 or the stock fuel is expected to be excessively heated in the heat exchanger 56, the stock fuel in the heat exchanger 56 is forcibly exhausted.

Figure 5:
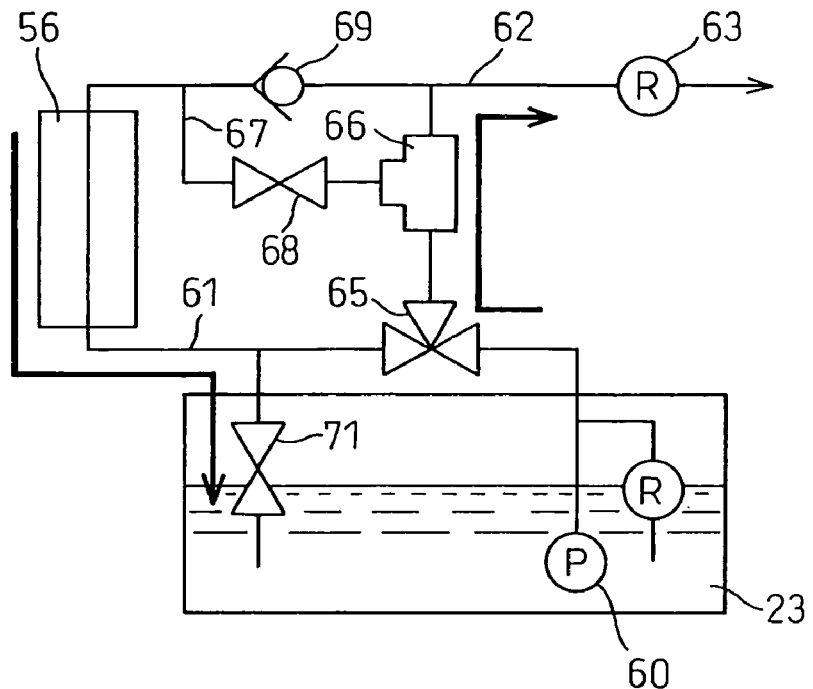
FIG. 5 is a view showing the flow of the stock fuel at the time of excessive heating of the fuel in the heat exchanger.
Figure 6:
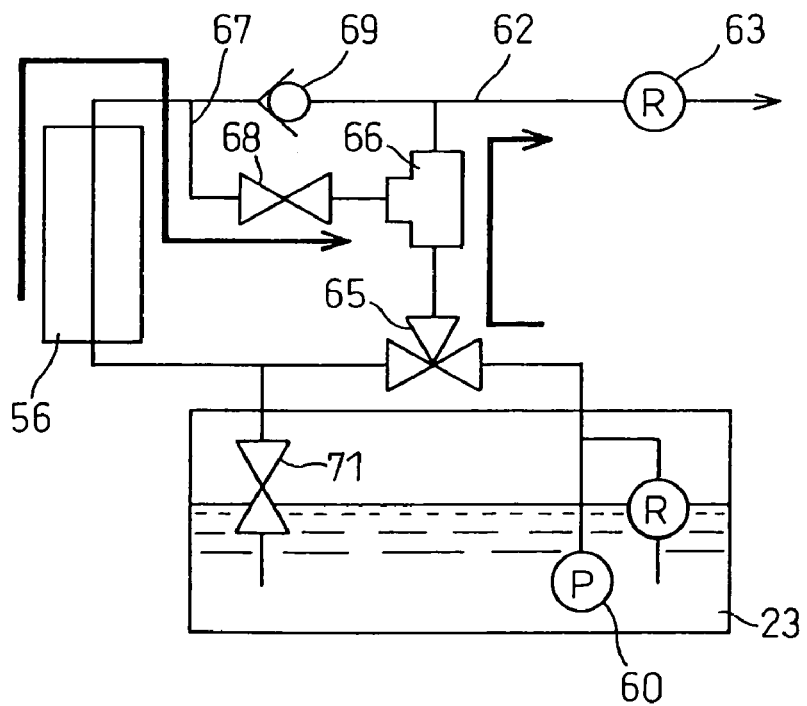
FIG. 6 is a view showing the flow of the stock fuel at the time of excessive heating of the fuel in the heat exchanger.

FIG. 5 and FIG. 6 are views showing the flow of the fuel when it is judged that the stock fuel is being excessively heated in the heat exchanger 56 or when it is judged that the stock fuel is expected to be excessively heated in the heat exchanger 56 (below referred to as "at the time of excessive heating").

At the time of excessive heating of the stock fuel in the heat exchanger 56, first the three-way valve 65 is set to the bypass pipe inflow position, the first shutoff valve 68 is closed, and the second shutoff valve 71 is opened. Therefore, as shown by the arrow in FIG. 5, the stock fuel raised in pressure by the fuel pump 60 passes through the three-way valve 65 and flows into the ejector 66. After this, the fuel flowing out from the ejector 66 passes through the regulator 63 and flows into the separation unit 57. By the stock fuel passing through the ejector 66, negative pressure is generated in the ejector 66, so the ejector 66 tries to suck in the fuel in the ejector communicating pipe 67 to the inside of the ejector 66, but the first shutoff valve 68 is closed, so the fuel inside the ejector communicating pipe 67 is not sucked into the ejector 66. Note that the fuel flowing out from the ejector 66 does not flow into the heat exchanger 56 due to the presence of the check valve 69.

Further, as explained above, at the time of excessive heating, the second shutoff valve 71 is opened. Therefore, the excessively heated stock fuel in the heat exchanger 56, as shown by the arrow in FIG. 5, is returned through the second shutoff valve 71 to the inside of the stock fuel tank 23. Due to this, part of the stock fuel inside the heat exchanger 56 is returned to the inside of the stock fuel tank 23. In particular, at the time of excessive heating, there is vaporized fuel inside the heat exchanger 56, but the gaseous part of this fuel flows to the vapor-phase part inside the stock fuel tank 23.

In this way, by opening the second shutoff valve 71, the fuel in the heat exchanger 56 is returned by a certain extent inside the stock fuel tank 23. If the pressure of the fuel in the heat exchanger 56 is reduced by a certain extent, next the first shutoff valve 68 is opened and the second shutoff valve 71 is closed while the three-way valve 65 is maintained in the bypass pipe inflow position. Therefore, as shown by the arrow in FIG. 6, the stock fuel raised in pressure by the fuel pump 60 flows into the ejector 66 through the three-way valve 65. By the stock fuel passing through the inside of the ejector 66, negative pressure is generated inside the ejector 66 and the fuel inside the ejector communicating pipe 67 and the fuel in the heat exchanger 56 are sucked into the ejector 66. However, the second shutoff valve 71 is closed, so even if suction is performed by the ejector 66, the fuel inside the stock fuel tank 23 will not be sucked through the second shutoff valve 71, heat exchanger 56, and first shutoff valve 68. Therefore, only the fuel in the heat exchanger 56 and ejector communicating pipe 67 is sucked in by the negative pressure generated by the ejector 66.

In this way, if the negative pressure of the ejector 66 causes the fuel in the heat exchanger 56 to be sucked in, the fuel remaining in the heat exchanger 56 without being returned to the stock fuel tank 23, will be forcibly exhausted from the inside of the heat exchanger 56. Since the fuel in the heat exchanger 56 is substantially completely expelled due to this, the heat exchanger 56 ending up heating the fuel more is prevented.

In this way, at the time of excessive heating, first the three-way valve 65 is switched to the bypass pipe inflow position and the second shutoff valve 71 is opened so as to reduce the pressure of the fuel in the heat exchanger 56, so bursting of the heat exchanger 56 or leakage of the fuel can be prevented. Further, by subsequently opening the first shutoff valve 68 and closing the second shutoff valve 71, the fuel in the heat exchanger 56 sufficiently drops in pressure, then the ejector 56 forcibly exhausts the fuel in the heat exchanger 56, so the fuel remaining in the heat exchanger 56 can be recovered by a high efficiency.

Note that in the present embodiment, whether or not the stock fuel is being excessively heated in the heat exchanger 56 is judged in accordance with the fuel temperature detected by a temperature sensor (not shown) provided in the heat exchanger 56 or at the downstream side of the heat exchanger 56. For example, when the fuel temperature detected by the temperature sensor is lower than a predetermined reference temperature, it is judged that the stock fuel is not being excessively heated in the heat exchanger 56. Conversely, when the fuel temperature detected by the temperature sensor is the predetermined reference temperature or higher, it is judged that the stock fuel is being excessively heated at the heat exchanger 56 and the fuel is exhausted from the heat exchanger 56 in the above-mentioned way. Here, the reference temperature can be the temperature by which, for example, if the fuel temperature rises to or above it, deterioration of the fuel properties is liable to be invited.

Alternatively, it is also possible to judge if the stock fuel is being excessively heated in the heat exchanger 56 according to the fuel temperature calculated based on the flow rate of the stock fuel flowing through the inside of the heat exchanger 56 and the amount of heat given from the heat exchanger to the stock fuel. Note that the amount of heat given from the heat exchanger 56 to the stock fuel can be calculated based on the temperature of the exhaust gas and flow rate of the exhaust gas when using an exhaust heat recovery system 25 as a heat exchanger 56.

However, when the operation of the internal combustion engine is stopped, even if the fuel in the heat exchanger 56 is not excessively heated right after the operation of the internal combustion engine, the fuel in the heat exchanger 56 will often end up being excessively heated when a certain extent of time elapses after the engine stop.

That is, if the operation of the internal combustion engine is stopped, the supply of fuel to the fuel injectors 11a, 11b is stopped. For this reason, the flow rate of the fuel flowing through the inside of the heat exchanger 56 also becomes substantially zero. Therefore, fuel will be retained in the heat exchanger 56. On the other hand, at the heat exchanger 56, even if the operation of the internal combustion engine is stopped, the supply of heat to the fuel will not be immediately stopped. Even if the operation of the internal combustion engine is stopped, the residual heat etc. remaining in the heat exchanger 56 will result in heat continuing to be supplied to the fuel. For this reason, even after the operation of the internal combustion engine is stopped, heat continues to be supplied to the fuel retained in the heat exchanger 56 and the fuel in the heat exchanger 56 ends up being excessively heated. Therefore, when the operation of the internal combustion engine is stopped, it is expected that the stock fuel will be excessively heated in the heat exchanger 56. For this reason, in the present embodiment, even when the operation of the internal combustion engine is stopped, the stock fuel inside the heat exchanger 56 is forcibly exhausted.

When the operation of the internal combustion engine is stopped, as shown in FIG. 6, the three-way valve 65 is set to the bypass pipe inflow position, the first shutoff valve 68 is opened, and the second shutoff valve 71 is closed. Further, for a fixed period even after the operation of the internal combustion engine stops, the fuel pump 60 for feeding fuel inside the stock fuel tank 23 continues to operate. Therefore, as shown by the arrow in FIG. 6, the stock fuel raised in pressure by the fuel pump 60 flows through the three-way valve 65 into the ejector 66. By the stock fuel passing through the inside of the ejector 66, a negative pressure is generated inside the ejector 66 whereby the fuel in the ejector communicating pipe 67 and the fuel in the heat exchanger 56 are sucked into the ejector 66. Due to this, the fuel in the heat exchanger 56 can be forcibly exhausted from inside the heat exchanger 56.

In particular, when the operation of the internal combustion engine is stopped, the fuel in the heat exchanger 56 is still not being excessively heated and therefore there is not much vaporized fuel in the heat exchanger 56. For this reason, the gaseous part of the fuel in the heat exchanger 56 does not have to be sent to the vapor phase part in the stock fuel tank 23. Therefore, when the operation of the internal combustion engine is stopped, that is, when it is expected that the stock fuel will be excessively heated in the heat exchanger 56, the state where first shutoff valve 68 is opened and the second shutoff valve 71 is closed is set without setting a state where the first shutoff valve 68 is closed and the second shutoff valve 71 is opened once (that is, the state shown in FIG. 5)

Note that the period during which the fuel pump 60 continues to be operated after the operation of the internal combustion engine is stopped (the fixed period) is made the time required for the ejector 66 to sufficiently exhaust the fuel in the heat exchanger 56. This fixed period is found in advance by experiments or by experience. Further, the fuel supplied from the fuel pump 60 is not immediately injected from the fuel injectors 11a, 11b after the operation of the internal combustion engine is stopped, but is stored in the high octane value fuel tank 51 or low octane value fuel tank 52 until the next operation of the internal combustion engine is started.

Figure 7:
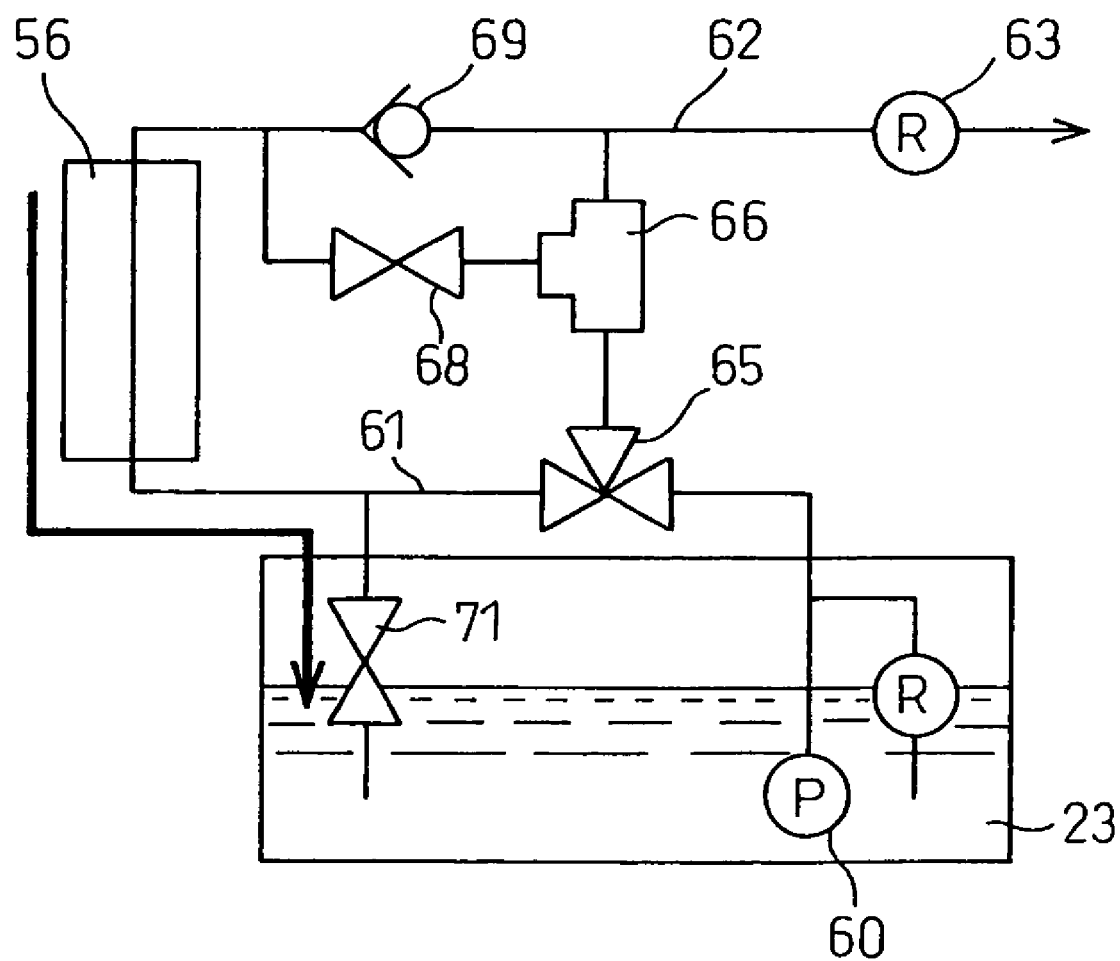
FIG. 7 is a view showing the flow of the stock fuel at the time of stopping the operation of the internal combustion engine.

Further, even when the operation of the internal combustion engine is stopped, it is also possible to close the first shutoff valve 68 and open the second shutoff valve 71 to return part of the fuel in the heat exchanger 56 to the inside of the stock fuel tank 23, then open the first shutoff valve 68 and close the second shutoff valve 71. Note that in this case, it is also possible to stop the operation of the fuel pump 60 to prevent the generation of negative pressure in the ejector 66 while the first shutoff valve 68 is closed (see FIG. 7).

While the invention has been described by reference to specific embodiments chosen for purposes of illustration, it should be apparent that numerous modifications could be made thereto by those skilled in the art without departing from the basic concept and scope of the invention.

The invention claimed is:

1. A vehicle-mounted fuel separation system comprising:
a stock fuel tank that stores stock fuel;
a fuel heating device heating the stock fuel;
a first pipe that connects the stock fuel tank and the fuel heating device;
a separator separating the stock fuel heated by said fuel heating device into a plurality of types fuel;
a second pipe that connects the fuel heating device and the separator;
a fuel pump that feeds the stock fuel from the stock fuel tank to the separator;
a bypass pipe that connects the first pipe and the second pipe;
an ejector that is disposed on the bypass pipe and is configured to supply the stock fuel from the stock fuel tank to the separator;
a temperature sensor that detects temperature of the stock fuel in the fuel heating device; and
wherein stock fuel is supplied from the stock fuel tank to the separator when the temperature of the stock fuel in the fuel heating device becomes a reference temperature or more or is expected to become said reference temperature or more.

2. A vehicle-mounted fuel separation system as set forth in claim 1, further comprising a forced exhaust device that includes the ejector that is disposed on the bypass pipe, wherein the forced exhaust device uses the negative pressure generated by the stock fuel being passed through said ejector so as to forcibly exhaust the stock fuel in the fuel heating device from said fuel heating device.

3. A vehicle-mounted fuel separation system as set forth in claim 1, further comprising a fuel return device for returning the stock fuel in the fuel heating device to the stock fuel tank, and
when the temperature of the stock fuel in the fuel heating device becomes said reference temperature or more or when it is expected to become said reference temperature or more, the return of the stock fuel in the fuel heating device by said fuel return device is started before the exhaust of the stock fuel in the fuel heating device by said forced exhaust device is started.

4. A vehicle-mounted fuel separation system as set forth in claim 3, wherein said fuel return device includes a branch passage branching off from a fuel feed passage, communicating said fuel heating device and the stock fuel tank and feeding the stock fuel from the stock fuel tank to the fuel heating device, toward the stock fuel tank and a shutoff valve provided at said branch passage, and said shutoff valve is opened when returning the stock fuel in the fuel heating device to the stock fuel tank.

5. A vehicle-mounted fuel separation system as set forth in claim 1, wherein at the time when the operation of an internal combustion engine is stopped, it is judged that it is a time when the temperature of the stock fuel in the fuel heating device is expected to become said reference temperature or more.

6. A vehicle-mounted fuel separation system as set forth in claim 1, wherein fuel heating device is a heat exchanger utilizing the heat generated by combustion of the air-fuel mixture in an internal combustion engine.

7. A vehicle-mounted fuel separation system as set forth in claim 1, wherein said fuel heating device utilizes the heat produced by electric power to heat the stock fuel.

8. A vehicle-mounted fuel separation system as set forth in claim 1, wherein said plurality of types of fuel include high octane value fuel with an octane value higher than the stock fuel and low octane value fuel with an octane value lower than the stock fuel.

\* \* \* \* \*